United States Patent Office 3,570,064
Patented Mar. 16, 1971

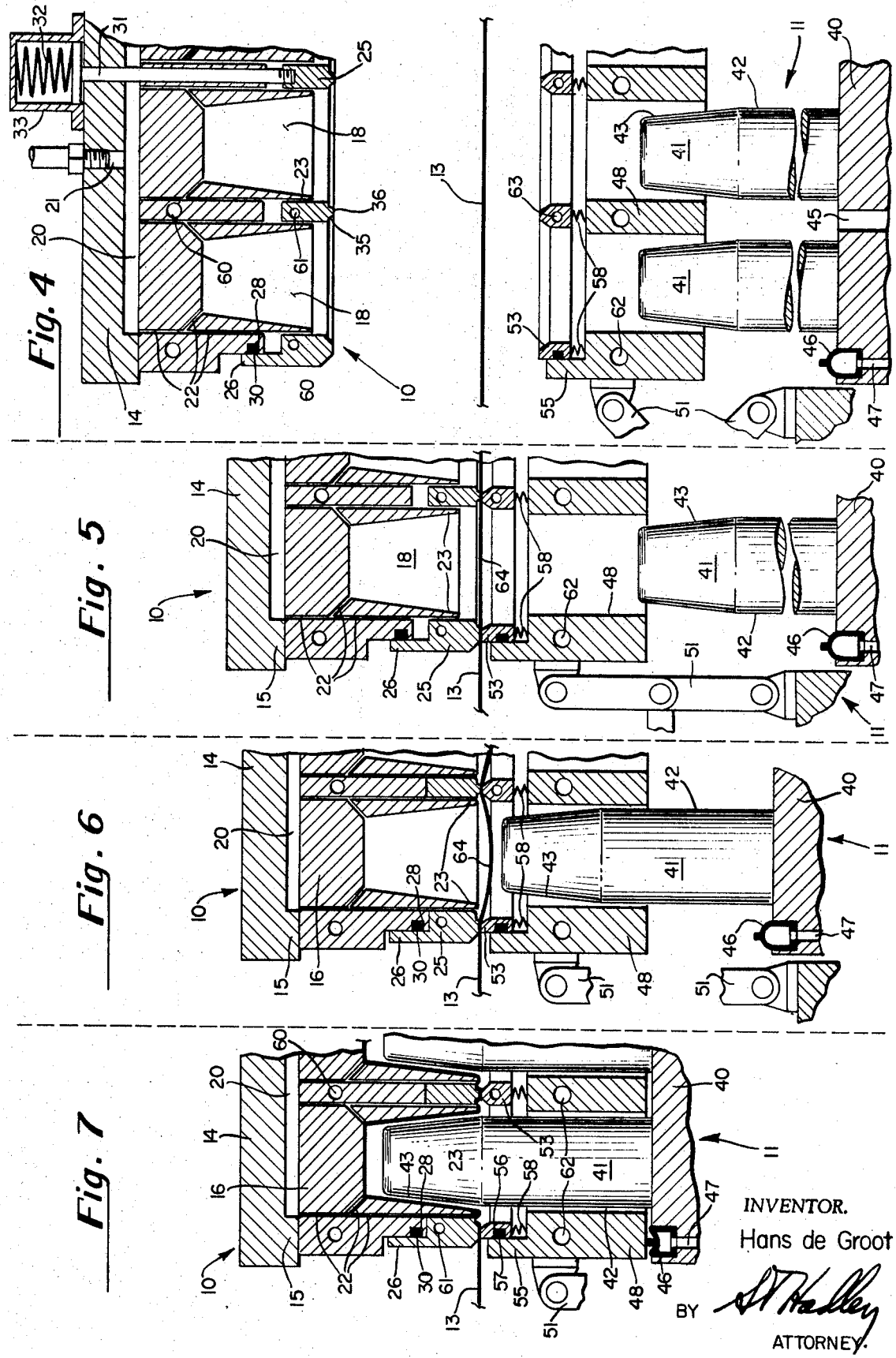

3,570,064
MOLDING APPARATUS HAVING A FLEXIBLE
CLAMP PLATE
Hans de Groot, Philadelphia, Pa., assignor to Scott Paper
Company, Delaware County, Pa.
Filed Aug. 13, 1968, Ser. No. 752,324
Int. Cl. B29c 3/00
U.S. Cl. 18—19
17 Claims

ABSTRACT OF THE DISCLOSURE

Molding apparatus having a flexible clamp plate which is resiliently mounted opposite one surface of a mold having a plurality of mold cavities and supported at a plurality of closely spaced points. The flexible clamp plate is arranged for relative movement toward and away from the mold so as to press a web of moldable material against a clamping surface about the periphery of each of the mold cavities between intermittent advancing movements of the web of moldable material between the mold and the clamp plate.

BACKGROUND OF THE INVENTION (1) Field of the invention

This invention relates to molding apparatus and, more particularly, to molding apparatus into which a web of moldable material is fed for the formation of molded articles therefrom as by differential pressure forming. Specifically, the invention is a flexible clamp plate for use in such apparatus which insures reliable clamping of a web of moldable material about the periphery of each mold cavity in a mold during formation of an article from enclosed unclamped areas of the web.

(2) Description of the prior art

Many forms of apparatus have been utilized for forming articles such as thin-walled containers from webs or sheets of moldable material, such as solid or cellular thermoplastic material. Some forms of this apparatus employ a single mold having a number of mold cavities into which the web is drawn by vacuum. Other forms of the apparatus use a pair of molds, one having male molds or plugs for assisting insertion of the web into female mold cavities in the other mold. Regardless of the particular form of apparatus employed, it has been found advantageous to clamp the web of moldable material about the periphery of each of the female mold cavities during formation of an article from enclosed unclamped areas of the web disposed over the mold cavities. There are several known devices for accomplishing such clamping. However, each device has been only partially successful and reliability of clamping in a production operation over a relatively long period continues to be a problem.

One known device involves the use of a rigid inflexible clamp plate which, in some instances, comprises a second mold or plate disposed opposite the mold cavities in the mold. This form of clamp plate depends for its success on careful machining of its surface and rigid support during its use to insure that its clamping surface is always in perfect alignment with and parallel to the clamping surface on the opposite mold plate. It can readily be seen that as molding machines become larger and the number of articles being molded at a given time increases, the size of the plate tends to result in unevenness in the clamping surface and inability to hold it rigid so as to obtain reliable clamping. In addition, wear of the clamping surface and perhaps wear of the means actuating it occurs during use, tending to reduce the clamping effectiveness of the plate and requiring that it be reground or realigned or both quite often to obtain good clamping.

Another device commonly used for clamping is an individual clamping ring mounted on an individual peripheral spring and pressed into engagement with the clamp surface about the periphery of each mold cavity. Although this means is believed to be superior to the above-mentioned device, it again is rigid and inflexible, and when wear occurs during use, it fails to provide reliable clamping about the periphery of the mold cavity. Furthermore, such separate devices take up considerable space, so that the number of molds of a given size per unit area is reduced.

It is, accordingly, an object of the present invention to provide apparatus capable of reliably clamping a web about the periphery of each mold cavity in a mold plate and which is able to perform in this manner and to compensate for wear of the clamp plate, the means actuating it, and the clamp surface about the periphery of the mold cavity.

SUMMARY OF THE INVENTION

The invention is a flexible clamp plate adapted for clamping a web of moldable sheet material to a surface about the periphery of each of a plurality of mold cavities during formation of articles in said mold cavities from enclosed unclamped areas of the web. The clamp plate is resiliently mounted on a support means and is movable relatively toward and away from the surface about the periphery of each mold cavity so as to permit intermittent passage of the web therebetween. The flexible clamp plate is employed in molding apparatus of the invention which includes a support member, a mold plate mounted for relative movement toward and away from the support member, the mold plate having a plurality of mold cavities opening toward the support member, means providing a clamping surface about the periphery of each of the mold cavities, and actuating means for creating relative movement between the mold plate and the support member in a manner permitting intermittent passage of a web of moldable material therebetween. Differential pressure forming means are included which are adapted to press the unclamped portions of the web overlying respective mold cavities into conformity with the mold cavities.

BRIEF DESCRIPTION OF THE DRAWINGS

FIGS. 4–7 are sectional elevation views of a portion of the apparatus shown in FIG. 1 and illustrate sequential steps of its operation.

DESCRIPTION OF THE PREFERRED EMBODIMENTS

Figure 1:
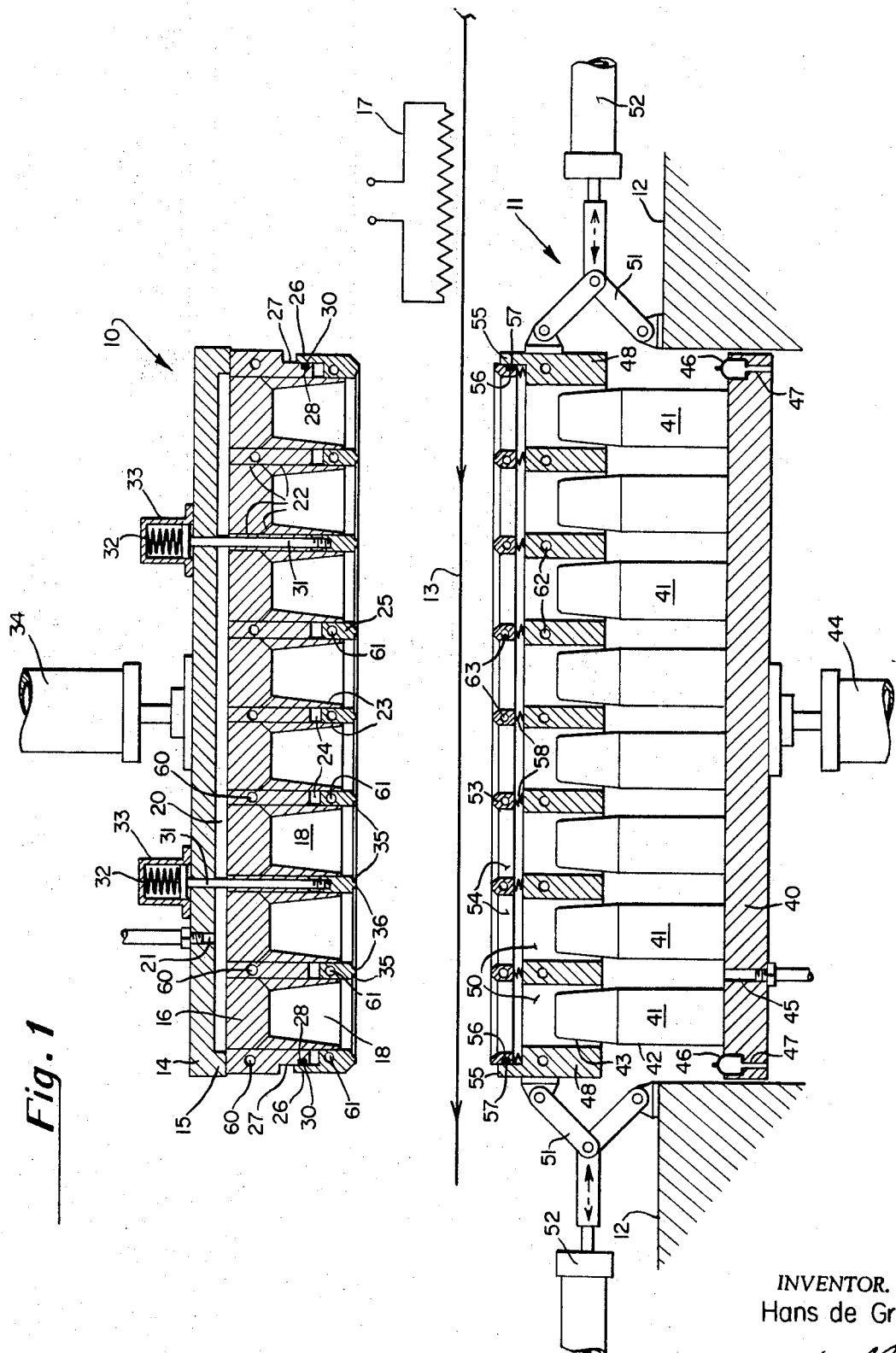
FIG. 1 is a sectional elevation view of a preferred form of the apparatus of the invention utilizing a preferred form of the flexible clamp plate of the invention.

FIG. 1 shows a sectional elevation view of one form of molding apparatus of the invention which utilizes a flexible clamp plate of the invention. The apparatus comprises two mold assemblies 10 and 11 carried by a frame 12. A web or sheet 13 of moldable material such as solid or cellular heated thermoplastic material is intermittently fed between the two mold assemblies by means (not shown) which are well known to those skilled in the art. Generally, such means are adapted to grip or attach to the side edges of the web or sheet 13 so as to convey it to and from the mold position in an intermittent fashion without interfering with the molding operation. Heating means 17 are arranged to heat the sheet 13 of moldable material in the case of thermoplastic material prior to its movement between the mold assemblies 10 and 11. In operation, the two mold assemblies 10 and 11 cooperate with one another to form articles from spaced areas of the sheet 13 of moldable material as by differential pressure forming, in some instances utilizing mechanical assistance in a manner well known to those skilled in the art.

The sheet 13 of moldable material may comprise a thermoplastic such as polyethylene or polystyrene, in either solid or cellular form, or laminates thereof. For example, polystyrene foam sheeting is often used in this type of apparatus to form containers for dispensing hot comestibles or beverages. The apparatus of the invention is useful wherever a sheet of moldable material must be clamped in portions during molding, and with any material which is temporarily flexible, resilient and moldable, but which will ultimately assume a new shape or configuration in which it is relatively fixed.

The mold assembly 10 includes a female mold mounting plate 14 having a downwardly extending flange 15 around the perimeter of its lower surface so as to form a recess in its lower surface. A female mold 16 is secured to the lower side of the mounting plate 14 as by bolts (not shown) extending through the mounting plate 14 and into the mold 16 to hold it in contact with the flange 15 of the mounting plate 14. The female mold 16 has a plurality of mold cavities 18 therein opening downwardly. A manifold chamber 20 is formed between the lower surface of the mounting plate 14 and the upper surface of the female mold 16 by the downwardly extending flange 15. The mold plate 14 has a passage 21 connecting the chamber 20 to a source of partial vacuum (not shown). In addition, other passages 22 connect the chamber 20 to various portions of the inside surface of each of the mold cavities 18 to facilitate the creation of partial vacuum at those portions so as to draw a portion of the sheet 13 of moldable material into contact with the surface of the mold cavity 18 to form it into an article such as a molded container. The area of the lower surface of the female mold 16 surrounding but spaced from the mold cavities 18 is recessed upwardly so as to form a network of interconnected grooves 24 separated by peripheral downwardly-extending portions 23 surrounding each mold cavity 18. A stripper frame 25 having openings therein aligned with the mold cavities 18 is disposed adjacent the lower surface of the female mold 16 in a manner such that portions of it extend into the grooves 24 in the lower surface of the mold 16. The stripper frame 25 has an upstanding peripheral flange 26 arranged for sliding contact with a peripheral side surface 27 of the female mold 16. The vacuum seal is maintained between the upstanding flange 26 of the stripper frame 25 and the side surface 27 of the female mold 16 by an O-ring seal 28 held in a groove 30 in the side of the female mold 16. A plurality of rods 31 extend through the female mold 16 and the mold plate 14 and connect the stripper frame 25 to a compression spring 32 contained in a housing 33 secured to the upper surface of the female mold mounting plate 14 so that the stripper frame 25 is resiliently mounted relative to the female mold 16. When pressure is applied to the lower surface of the stripper frame 25, the stripper frame 25 moves toward the female mold mounting plate 14 and further into the grooves 24 in the female mold 16 while compressing the springs 32.

An air cylinder 34 is connected to the upper surface of the female mold mounting plate 14 and is arranged to advance the mold assembly 10 downwardly into contact with the sheet 13 of moldable material. The stripper frame 25 has a plurality of openings therethrough having a cross-sectional area at least as large as that of the mold cavities 18 and being of similar shape. The lower surface 36 of the stripper frame 25 about each of the openings is recessed upwardly, to form an upwardly and inwardly tapering surface 35 about the lower portion of each of the openings. In practice, the sheet of moldable material is clamped against the lowermost surface 36 of the stripper frame 25 adjacent the point where the inclining side surface 35 terminates with the bottom surface 36. The recessing described provides some excess sheet material which may be chilled through the clamping action prior to formation of the article without affecting formation of the container since the container can then be formed from uniformly heated, flexible, stretchable sheet material which is not contacted by portions of the mold or influenced by the clamping action prior to substantial deformation into the desired shape, as will be described below.

The mold assembly 11 includes a male mold mounting plate 40 having a plurality of upstanding male molds or plugs 41 secured thereto. The plugs 41 have a cylindrical lower portion 42 and an upwardly and inwardly tapered upper portion 43, the tapered upper portion 43 being of a size and shape permitting its insertion into the mold cavities 18. An air cylinder 44 is connected to the male mold mounting plate 40 and is arranged to move the plate 40 and the plugs 41 toward and away from the sheet 13 of moldable material and the mold assembly 10. Male mold mounting plate 40 has an opening 45 therethrough connected to a source of air pressure (not shown) which may be used to assist in the differential pressure forming operation of sheet 13 as will be subsequently described. In addition, a peripheral sealing member 46 extends about the perimeter of the upper surface of the male mold mounting plate 40. The member 46 connects through an opening 47 in the mounting plate 40 to a source of fluid pressure (not shown) to provide an inflatable seal. Upon upward movement of the male mold mounting plate 40, the seal 46 contacts other surfaces of the apparatus as will be subsequently described and allows the entire internal space surrounding the male molds 41 to be pressurized greater than atmospheric pressure to assist in differential pressure forming, again in a manner to be described.

A clamp frame 48 is disposed between the sheet 13 of moldable material and the male mold mounting plate 40. The clamp frame 48 has a plurality of openings 50 therethrough of sufficient size to permit through-extension of the male molds 41 during their travel toward and into the mold cavities 18. Thus, the mold cavities 18, the openings 50, and the male molds or plugs 41 are aligned with one another. The clamp frame 48 is movably supported by a plurality of toggles 51 distributed about its periphery and connecting it to the frame 12. An air cylinder 52 is connected to each toggle 51 and adapted to move the clamp frame 48 toward and away from the stripper frame 25 in a manner to be described. The bottom peripheral surface of the clamp frame 48 is positioned directly above the inflatable seal 46 so that upon movement of the seal 46 into contact with the bottom surface of the clamp frame 48, a pneumatic seal is established about the periphery of the mold assembly 11.

A flexible clamp plate 53 of the invention is disposed above the clamp frame 48 and is resiliently supported thereon in accordance with the invention. The flexible clamp plate 53 is more clearly shown with reference to FIGS. 2 and 3. The plate may be formed of any flexible material, metal being preferred. The clamp plate has a plurality of openings 54 therein having a cross-sectional area slightly larger than that of the mold cavities or the openings 50 of the clamp frame 48. The openings 54 are outwardly enlarged toward their upper ends, that is, the portions of the plate defining the upper side walls of the openings 54 incline radially outwardly toward the upper surface of the clamp frame 48 shown more clearly in FIG. 3. The clamp frame 48 has a peripheral upstanding flange 55 extending alongside the periphery of the flexible clamp plate 53. The clamp plate 53 has a groove 56 extending around its peripheral surface containing an O-ring seal 57 which contacts the inside wall of the flange 55 of the clamp frame 48 maintaining a pneumatic seal therebetween while permitting movement of the clamp plate 53 relative to the clamp frame 48.

The clamp plate 53 is resiliently supported on the clamp frame 48 by a plurality of compression springs 58 retained in position by a plurality of bosses or recesses (neither being shown) in clamp frame 48 and/or clamp plate 53 and disposed at spaced positions between openings therein. In the embodiment shown, the springs 58 are disposed at positions between four openings 54 in the plate 53 and the frame 48. It will be apparent that the precise location and arrangement of the holes 54 and the supporting springs 58 might be varied. To avoid problems from overheating the molding apparatus which almost continuously contacts heated thermoplastic material, many of the elements of the apparatus described above may be advantageously cooled through the use of circulating fluids passing through passages such as the passages 60 in the female mold 16, the passages 61 in the stripper frame 25, the passages 62 in the clamp frame 48, and the passages 63 in the clamp plate 53.

Figure 2:
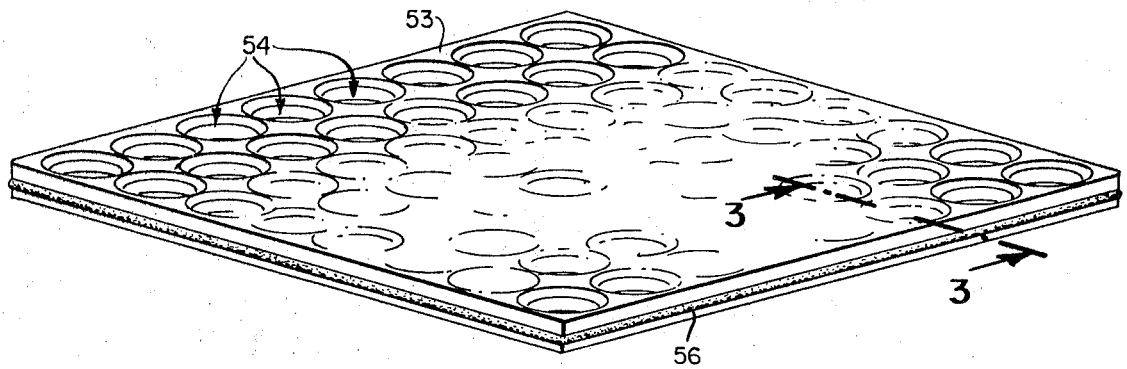
FIG. 2 is a perspective view of a preferred form of the flexible clamp plate of the invention.
Figure 3:
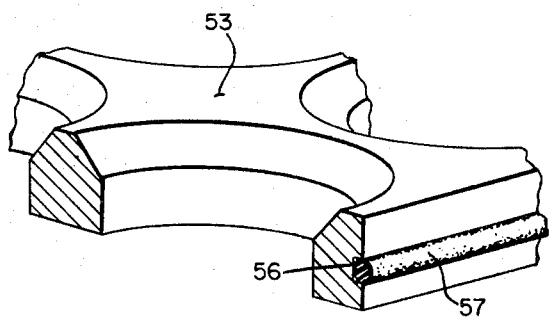
FIG. 3 is an enlarged perspective view of a portion of the flexible clamp plate of FIG. 2, showing part in section.

In accordance with the invention, the clamp plate 53 should be relatively more flexible than any of the structures on which it is supported by the springs 58, and should be relatively more flexible than any of the structures against which it is pressed in operation. That is, the clamp plate 53 should be more flexible than the clamp frame 48 and should be more flexible than the female mold mounting plate 14, the mold 16, or the stripper frame 25. This insures that when sufficient force is exerted against the clamp plate 53 as the mold assembly 10 and clamp frame 48 move together, the clamp plate will be flexed and pressed through the action of compression springs 58 into conformity with the surface against which it bears so as to reliably clamp the sheet 13 of moldable material therebetween. The flexibility of the plate need not be very great to be successful in accordance with the invention. The sheet 13 of moldable material is generally quite thin, on the order of from about 0.01 to about 0.20 inch in thickness, and is quite uniform in thickness. In addition, this material generally is fairly uniformly compressible so as to provide fairly uniform resistance to pressure from the clamping elements. The flexibility of clamp plate 53 can be regulated to some degree by the size of the cross-section between openings 54, which is generally relatively small, as shown in FIGS. 2 and 3. In practice, a flexibility in the clamp plate of about 0.10" over a distance of 2 feet when the clamp plate is subjected to normal clamping pressures in a molding operation has been found satisfactory to achieve the benefits of the invention. Of course, as is well known, the other elements of the apparatus described above have negligible flexibility and are substantially rigid structures.

FIGS. 4–7 sequentially illustrate the manner in which the apparatus of the invention operates. FIG. 4 illustrates the position of the various elements of the apparatus during removal of the previously formed articles therefrom and movement of the fresh moldable sheet material 13 into position. The air cylinder 34 (shown in FIG. 1) lifts the mold assembly 10 upwards and the air cylinder 44 (shown in FIG. 1) draws the mold assembly 11 downwardly so that the plugs 41 are completely removed from the mold cavities 18 and the clamp frame 48 and the clamp plate 53 are withdrawn from contact with the sheet 13. The stripper frame 25 is in its lowermost position and the distance between clamp plate 53 and clamp frame 48 is at a maximum under the influence of compression springs 58, the distance being limited by a plurality of shoulder bolts (not shown) between clamp plate 53 and clamp frame 48.

FIG. 5 illustrates the position in which the sheet 13 of moldable material is gripped by the clamp plate 53 contacting the stripper plate 25. The air cylinder 34 initially lowers the mold assembly 10 into contact with the sheet 13 of moldable material while the air cylinder 52 (shown in FIG. 1) operating through the toggles 51 raises the clamp frame 48 upwardly so that the clamp plate 53 of the invention is firmly pressed into contact with the lower surface of the stripper frame 25. This causes the sheet 13 of moldable material to be reliably clamped and gripped between the upper surface of the flexible clamp plate 53 and the lower surface of the stripper plate 25 about the perimeter of each mold cavity 18. The clamped areas of the heated sheet 13 of moldable material are cooled by contact with the plates 25 and 53, thereby facilitating securement thereof by the two clamping surfaces which may be of a coarse finish to facilitate gripping of the material.

FIG. 6 illustrates the next step of the forming process in which the air cylinder 34 moves the mold assembly 10 completely down so that the portions 23 of the mold 16 advance toward the sheet 13 while the stripper frame 25 remains in the same position relative to the sheet 13 of moldable material. This movement creates a slight air pressure internally of the mold cavity 18 causing the unclamped portion 64 of the sheet 13 of moldable material, that is, the portion overlying the mold cavity 18 and surrounded by the clamped area, to be presseed downwardly out of contact with the edges or portions 23 of the mold 16. This is desirable in that, otherwise, the portions 23 of the mold 16 would tend to cool portions of the web 13 of moldable material prior to their being stretched during formation of the article thereby resulting in a defective article. The air cylinder 44 also commences upward movement of the male mold mounting plate 40 so that the male mold 41 is positioned to begin assisting in the formation of the article.

FIG. 7 illustrates the position of the apparatus in the next step of the forming process in which the male mold 41 has penetrated the mold cavity 18 and the article is formed by the differential pressure forming process. After the male mold or plug 41 has at least partially advanced the sheet 13 of moldable material into the mold cavity 18, vacuum is applied to the chamber 20 through the opening 21 which influences or acts on the sheet 13 of moldable material by means of the number of passages 22 through the mold 16 terminating adjacent different points on the internal mold surface in the mold cavity 18. When upward movement of the male mold mounting plate 40 is sufficient to bring the inflatable seal 46 into contact with the lower surface of the clamp frame 48, air pressure is applied through the opening 45 into the chamber surrounding the plugs 41. This air pressure contacts one surface of the sheet 13 of moldable material thereby assisting in the molding operation by pressing the sheet 13 into conformity with the internal mold surface in the mold cavity 18. Contact of the internal mold surface in the mold cavity 18 by the sheet 13 of moldable material causes the moldable material to cool to a point where it achieves a fairly rigid set whereupon it is removed from the mold cavity 18.

Removal occurs when the apparatus returns to the position shown in FIG. 4 whereupon when the mold assembly 10 is drawn upwardly by the air cylinder 34, the spring 32, which was earlier compressed by the action described with reference to FIG. 6, now presses the stripper frame 25 downwardly thereby withdrawing the surface of the sheet 13 from contact with the internal mold surface of the mold cavity 18. The sheet 13 of moldable material containing the articles as an integral part thereof is advanced again to provide fresh moldable material in a heated state between the two mold assemblies 10 and 11 and the articles are then cut from the sheet 13 and, in the case of the containers being formed by the apparatus shown in the drawings, the lips are rolled to form the finished article.

Figure 8:
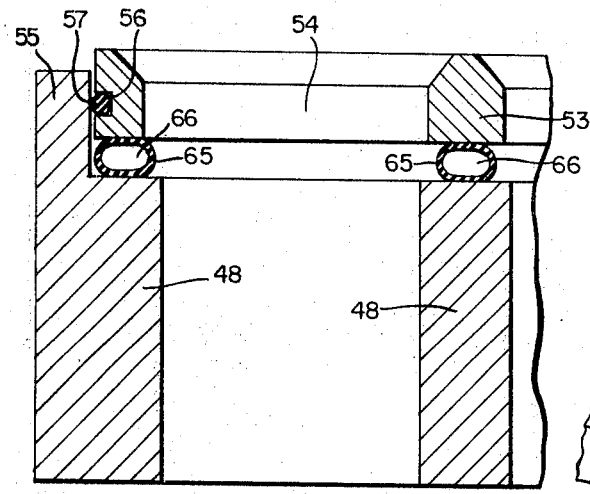
FIGS. 8 and 9 are enlarged sectional views of portions of the apparatus shown in FIG. 1, specifically illustrating alternative embodiments of the flexible clamp plate of the invention.

FIG. 8 discloses an alternative embodiment of the flexible clamp plate 53 and mounting means therefor in which the compressible springs 58 shown in FIG. 1 and FIGS. 4-7 are replaced by a type of inflatable seal comprising an elongate tube 65 of flexible material filled with a gas 66. The flexible material may be of any type of hose material such as rubber or rubberized fabric. This form of resilient mounting means insures a uniform pressure being applied to the supported portions of the flexible clamp plate 53 thereby enabling the clamp plate 53 to conform to contacted portions in the lower surface of the stripper frame 25 which may be uneven, to insure reliable clamping of the sheet 13 of moldable material therebetween at all points about the periphery of each of the mold cavities 18.

Figure 9:
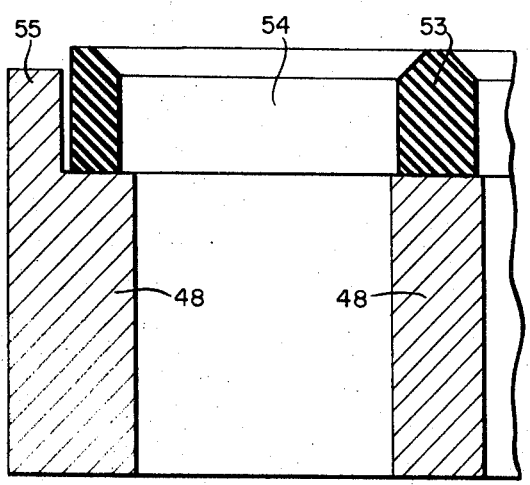

FIG. 9 discloses a still further embodiment of the flexible clamp plate 53 of the invention in which the resilient mounting means are incorporated into the clamp plate 53. In the embodiment shown the clamp plate 53 is formed of a resilient material such as a rubber capable of withstanding the temperatures experienced in a molding operation. The rubber permits deformation of the plate 53 to occur where unevenness of the stripper plate is experienced thereby insuring reliable clamping about the periphery of each of the mold cavities 18. In other embodiments, the clamp plate 53 shown in FIG. 9 might comprise a layer of metal having a coating on one side thereof of a rubber or other resilient material permitting deformation of the plate 53 at various points in response to pressure due to unevenness of the lower surface of the stripper frame 25.

What is claimed is:

1. A flexible clamp plate adapted for clamping a web of moldable sheet material to a surface about the periphery of each of a plurality of mold cavities during formation of articles in said mold cavities from enclosed unclamped areas of said web, said clamp plate being resiliently mounted on a support means and being movable relatively toward and away from said surface so as to permit intermittent passage of said web therebetween.

2. A flexible clamp plate according to claim 1, wherein said clamp plate comprises a flexible incompressible material and includes resilient mounting means.

3. A flexible clamp plate according to claim 2, wherein said resilient mounting means comprise at least one compressible pneumatic element including a flexible tube enclosing a gas.

4. A flexible clamp plate according to claim 2, wherein said resilient mounting means comprise at least one compressible member of elastomeric material.

5. A flexible clamp plate according to claim 2, wherein said resilient mounting means comprise a plurality of spaced spring elements disposed about the periphery of each mold cavity.

6. A flexible clamp plate according to claim 5, wherein said spaced spring elements which are common to the peripheries of several mold cavities have a different compression rating than those which are not common to the peripheries of more than one of said mold cavities, whereby substantially uniform clamping pressure is applied to said clamp plate over its entire area.

7. A flexible clamp plate according to claim 1, wherein said clamp plate is comprised of a flexible elastomeric material.

8. A flexible clamp plate according to claim 1, wherein said clamp plate has a plurality of openings therethrough which are aligned with said mold cavities so as to permit insertion of forming tools into said cavities through said openings for use in forming articles from said enclosed unclamped areas of said web.

9. Molding apparatus comprising
a support member,
a mold plate mounted for relative movement toward and away from said support member, said mold plate having a plurality of mold cavities opening toward said support member,
means providing a clamping surface about the periphery of each of said mold cavities,
actuating means for creating relative movement between said mold plate and said support member in in a manner permitting intermittent passage of a web of moldable material therebetween,
differential pressure forming means adapted to press the portions of said web overlying respective mold cavities into conformity with said mold cavities, and
a flexible clamp plate disposed between said mold plate and said support member, said clamp plate being resiliently mounted on said support member and being adapted to reliably clamp said web to said clamping surface about the periphery of each of said mold cavities during the pressing of said portions of said web overlying respective mold cavities into conformity with said mold cavities.

10. Molding apparatus according to claim 9, wherein said clamp plate has a plurality of openings therethrough which are aligned with said mold cavities, and wherein said molding apparatus includes a second mold plate disposed opposite the first, said second mold plate being relatively movable toward and away from said first mold plate and having a plurality of plugs directed toward said mold cavities and adapted to pass through said openings in said clamp plate and into said mold cavities to assist in forming articles from enclosed unclamped areas of said web.

11. Molding apparatus according to claim 9, wherein said mold plate has a relatively large number of closely-spaced mold cavities, whereby high output is attained in a minimal mold area and whereby waste of moldable web material is substantially minimized.

12. Molding apparatus according to claim 9, wherein said clamp plate comprises a flexible incompressible material, and said apparatus includes resilient mounting means between said support member and said clamp plate.

13. Molding apparatus according to claim 12, wherein said resilient mounting means comprise at least one compressible pneumatic element including a flexible tube enclosing a gas.

14. Molding apparatus according to claim 12, wherein said resilient mounting means comprise at least one compressible member of elastomeric material.

15. Molding apparatus according to claim 12, wherein said resilient mounting means comprise a plurality of spaced spring elements disposed about the periphery of each mold cavity.

16. Molding apparatus according to claim 15, wherein said first mold plate has a plurality of mold cavities, some of which are surrounded by other mold cavities, and said spaced spring elements common to the peripheries of several mold cavities have a different compression rating than those adjacent the edge of said mold plate, whereby substantially uniform clamping force is applied to said clamp plate over its entire area.

17. Molding apparatus according to claim 9, wherein said clamp plate is comprised of a flexible elastomeric material.

References Cited

UNITED STATES PATENTS

| 2,967,328 | 1/1961 | Shelby et al. | 18—19F |
| 3,081,491 | 3/1963 | Black | 18—19F |
| 3,339,238 | 9/1967 | Rapp | 18—19F |

FOREIGN PATENTS

| 417,047 | 1/1967 | Switzerland | 18—Clampery Dig. |

WILLIAM S. LAWSON, Primary Examiner